Aug. 16, 1949.   C. D. FLAGLE   2,478,909
TURBINE APPARATUS
Filed Sept. 9, 1944   2 Sheets-Sheet 1
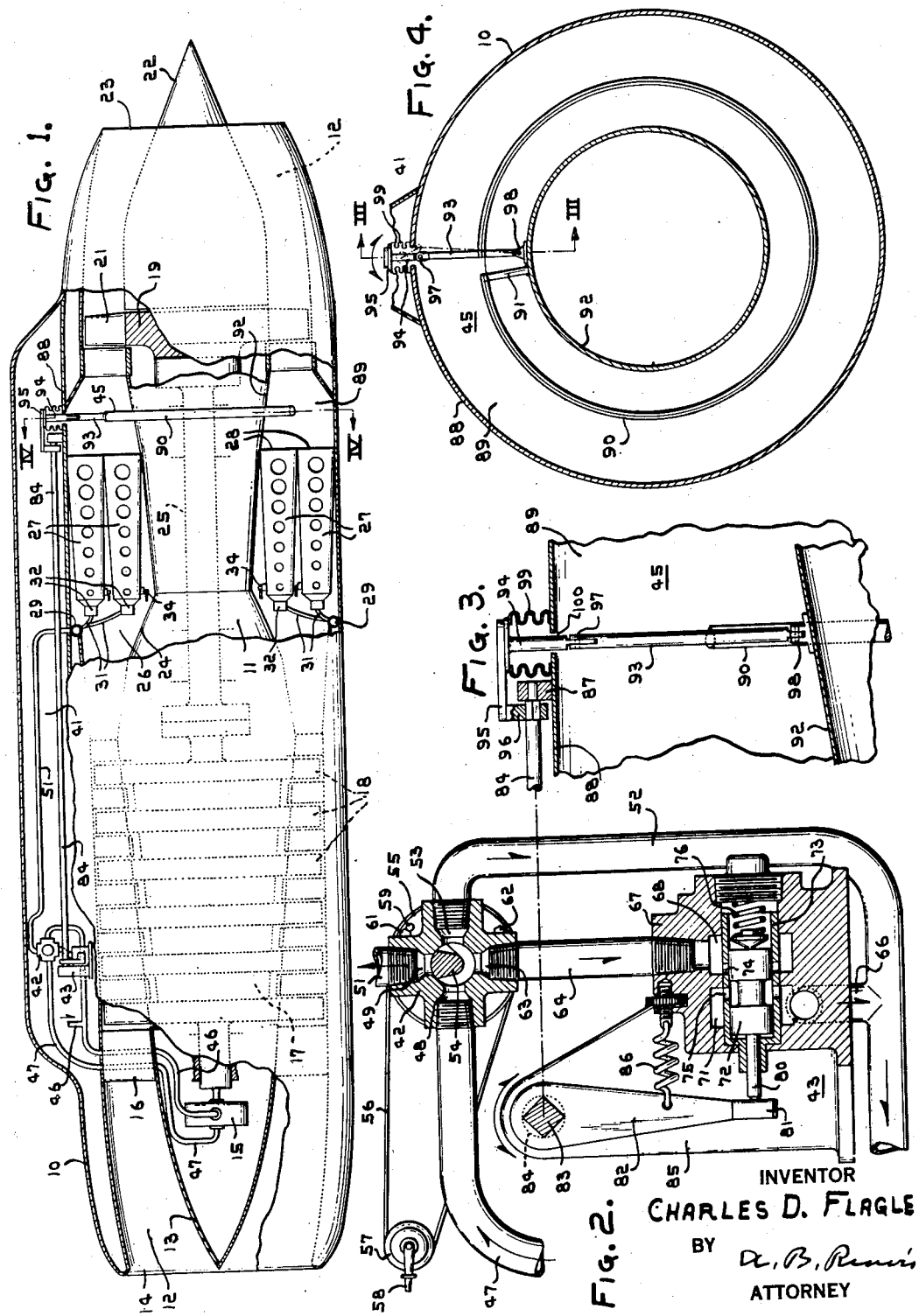
INVENTOR
CHARLES D. FLAGLE
BY
ATTORNEY Aug. 16, 1949.                    C. D. FLAGLE                    2,478,909
                                 TURBINE APPARATUS Filed Sept. 9, 1944                                           2 Sheets-Sheet 2

WITNESSES:                                                INVENTOR
                                              CHARLES D. FLAGLE.
                                                       BY
                                                         ATTORNEY

Patented Aug. 16, 1949

2,478,909

UNITED STATES PATENT OFFICE 2,478,909

TURBINE APPARATUS

Charles D. Flagle, Swarthmore, Pa., assignor to Westinghouse Electric Corporation, East Pittsburgh, Pa., a corporation of Pennsylvania Application September 9, 1944, Serial No. 553,422

1 Claim. (Cl. 236—101)

This invention relates to temperature-responsive devices, more particularly to such devices for controlling flow of energy medium in response to temperature variations, and has for an object to provide an improved device of this character.

Another object of the invention is to provide an improved device for controlling the quantity of fuel supplied to a gas turbine plant to prevent overheating thereof.

A further object of the invention is to provide a temperature-responsive member having the characteristic that its modulus of elasticity drops slowly with increases in temperature below a predetermined degree and drops rapidly with increases in temperature above said predetermined degree.

The present invention, while not limited thereto, is particularly adapted to be used to control a gas turbine power plant similar to that disclosed in the copending application of Stewart Way, Serial No. 482,533, filed April 10, 1943, now Patent No. 2,405,723, dated August 13, 1946, and assigned to the assignee of the present invention. A power plant of the type disclosed in the mentioned Way application includes an axial-flow air compressor, air heating apparatus, a gas turbine, and a propulsion jet nozzle all housed in line within a streamlined tubular casing. A plant of this character is particularly suitable for propelling aircraft at high speeds and operates generally as follows: Air enters the forward end of the tubular casing, which is pointed in the direction of flight, and is compressed in the compressor, the compressed air then being heated in the heating apparatus by the combustion of fuel supported by the compressed air. The resulting motive fluid comprising the products of combustion and the excess compressed air drives the turbine and is then discharged through the propulsion nozzle as a jet, the reaction of which serves to propel the aircraft. The turbine extracts at least sufficient power from the motive fluid to drive the compressor and auxiliaries. The fuel is supplied to the air heating apparatus, under the control of a throttle valve, by means of a positive displacement pump which is preferably driven by the turbine.

In Patent No. 2,404,428 issued July 23, 1946 to Donald Bradbury and assigned to the assignee of the present application, there is disclosed one form of temperature-responsive means for reducing the rate of flow of fuel to the combustion apparatus of a similar gas turbine plant in response to excessive temperature of the motive fluid entering the turbine, this means comprising a straight, rodlike member extending radially into the annular flow path of hot gases passing from the combustion apparatus to the turbine. This type of temperature-responsive means has a disadvantage in that it measures temperature at only one point in the hot gas stream.

The present invention overcomes this difficulty by providing a temperature-responsive means of annular form adapted to extend throughout substantially the entire annular extent of the hot gas passage, with the result that it is subject to the temperature conditions existing at the discharge side of all of the plurality of combustion nozzles arranged about the annular combustion chamber.

Therefore, another object of the invention is to provide a fuel control for a gas turbine plant, which control is responsive to the temeratures existing at a plurality of points in the cross section of the flow path of hot gases to the turbine.

Yet another object of the invention is to provide, in a gas turbine plant having an annular passage for hot gases from the combustion chamber to the turbine, an arcuate temperature-responsive member disposed in the annular hot gas passage, and which is responsive to temperature conditions existing throughout substantially the entire arcuate extent of the passage.

A further object of the invention is to provide a temperature-responsive member which exerts a predetermined controlling force at a selected temperature and a lesser controlling force at a higher temperature, due to decrease in modulus of elasticity with increase in temperature.

These and other objects are effected by the invention as will be apparent from the following description and claims taken in connection with the accompanying drawings, forming a part of this application, in which:

Fig. 1 is a side elevational view of a gas turbine power plant in which the present invention has been incorporated, a portion of the outer casing structure being broken away to show certain details of construction;

Fig. 2 is an enlarged view of the control apparatus, parts thereof being shown in section for the sake of clearness;

Fig. 3 is a sectional view taken along the line III—III of Fig. 4, looking in the direction indicated by the arrows;

Fig. 4 is a sectional view taken along the line IV—IV of Fig. 1, looking in the direction indicated by the arrows, certain parts being omitted for the sake of clearness;

Figure 5:
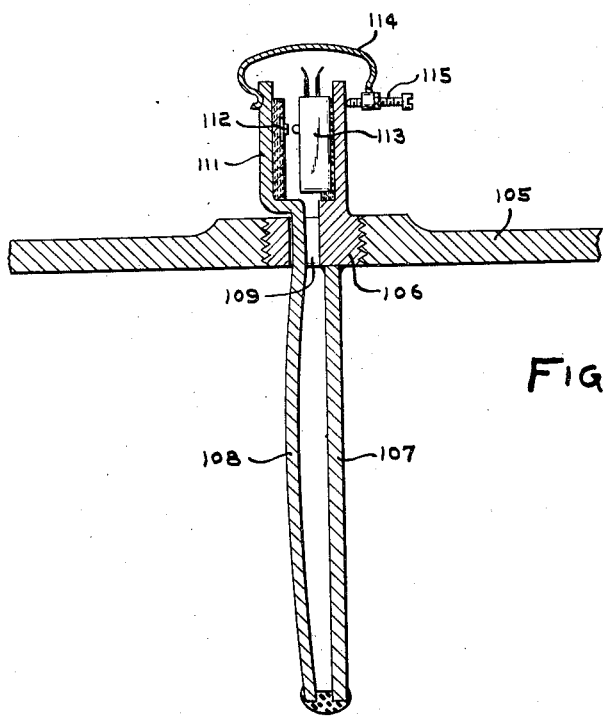
Fig. 5 is an elevational view of a modified form of temperature-responsive device; and, Fig. 6 is a graph of the modulus of elasticity characteristic of one material of which the temperature-responsive member may be made.

The power plant shown in Fig. 1 comprises, in general, an outer tubular casing structure 10, open from end to end and having a central core 11 providing, with the casing, an annular flow passage 12, which, if the plant is to be used for propelling an airplane, is adapted to extend fore and aft with respect to the airplane. The central core structure 11 is supported by the outer casing structure along its longitudinal axis and includes a hollow fairing cone 13 defining with the forward or left end, as viewed in Fig. 1, of the casing 10 an air inlet 14. The fairing cone 13 houses a fuel pump, generally indicated 15, and other auxiliaries (not shown) and is supported from the casing 10 by hollow compressor guide vanes 16.

The core 11 also includes the rotor 17 of an axial-flow compressor 18, the fixed blades of which are carried by the casing 10, the rotor 19 of a gas turbine 21 and a longitudinally adjustable conical tailpiece 22 which defines with the rear end of the casing 10 an adjustable propulsion nozzle 23.

The intermediate portion of the core structure between the compressor 18 and the turbine 21 comprises an inner tubular wall structure 24 which houses a shaft 25 connecting the turbine rotor 19 and compressor rotor 17. The inner wall structure 24 defines, with the casing 10, an annular chamber 26 connecting the compressor blade passage and the turbine blade passage.

The chamber 26 is provided with suitable air heating means, such as shown in the copending application of Way et al. for heating the air compressed by the compressor. In the embodiment shown, a plurality of perforated, tapered burner tubes 27 are mounted in the annular chamber 26 with their large open ends 28 directed downstream. Fuel is supplied to the burner tubes 27 from a manifold 29, connected to a fuel supply as hereinafter described, and is fed through branch pipes 31 to atomizing nozzles 32 extending into the burner tubes. Suitable means, including spark plugs 34 extending into the burner tubes, are provided for igniting the air-fuel mixture in the burner tubes.

The present invention is not concerned with the specific design of the apparatus thus referred to, although it is preferably constructed in accordance with the disclosure of the mentioned Way application.

The power plant operates substantially as follows:

Air enters the casing 10 at the inlet 14, is compressed by the compressor 18, and flows into the annular chamber 26, which may function as a diffuser to effect further compression. The compressed air then passes through the openings in the walls of the burner tubes 27 and mixes with the atomized fuel supplied by the nozzles 32.

The air and fuel mixture is ignited by the spark plugs 34 and burns steadily thereafter. The motive fluid comprising the products of combustion and the excess air flows from the burner tubes 27 and is directed by fixed guide vanes or nozzles 35 into the blade passage of the turbine rotor 19. The turbine 21 extracts at least sufficient energy from the motive fluid to drive the compressor 18, pump 15 and other auxiliary apparatus that may be housed in the fairing cone 13. The spent gases leaving the turbine are discharged through the propulsion nozzle 23 at a high velocity so that the remaining energy in the motive fluid is available to propel the aircraft. The tailpiece 22 is preferably axially movable with respect to the casing 10 so that the back pressure on the turbine and the jet effect produced by the nozzle may be varied.

The present invention is particularly concerned with maintaining the temperature of the motive fluid entering the turbine within safe limits by regulating the fuel supplied to the burners 27.

The temperature-controlling apparatus which regulates the fuel supply may conveniently be housed within a tunnel 41 formed in the top of the casing 10, which tunnel also houses lubricating and fuel oil pipes and ignition wires.

The fuel supply system for the burner tubes comprises the pump 15, which is of the constant displacement type and driven by the turbine so that its output is independent of pressure and depends only on the rotational speed of the turbine shaft, a manually adjustable throttle valve 42, of the by-pass type, and a control valve 43 which, when open, also bypasses fuel to the inlet side of the pump 15 to reduce the amount of fuel going to the burners. As will appear later, the control valve 43 is actuated by a temperature-measuring device generally indicated 45, to reduce the amount of fuel flowing to the burners in the event that the motive fluid discharging from the burners attains a temperature which might cause damage to the turbine. By reducing the rate of flow of fuel to the burners under this condition, a corresponding lowering of the temperature of the motive fuel is obtained.

The fuel, such as gasoline, for the burner tubes 27 flows from a suitable tank (not shown) carried by the aircraft into a main supply pipe 46 to the inlet side of the pump 15. The outlet or discharge side of the pump is connected by means of a pipe 47 to inlet 48 of the four-way, rotary throttle valve 42. One outlet 49 of the valve 42 is connected by a pipe 51 to the manifold pipe 29 of the burner tubes.

Manual regulation of the rate of flow of fuel to the burner tubes to vary the speed of the turbine is effected by adjusting the throttle valve 42 to by-pass more or less of the fuel flowing into the inlet 48 to the suction side of the pump by means of a pipe 52 leading from a second outlet 53 of the throttle valve to the pump inlet pipe 46.

The throttle valve 42 comprises a valve body in which a rotatable valve member 54 is received. The valve member is manually rotated, to regulate the amount of oil flowing to the burners and through the by-pass pipe 52 by suitable means, such as the wheel 55 fixed thereto and connected by a cable 56 to a pulley 57, to which is fixed a hand throttle lever 58. The throttle lever 58 is located for convenient manipulation by the pilot of the aircraft.

In Fig. 2, the throttle valve 42 is shown in closed position so that all of the fuel is by-passed or returned to the pump 15 through pipe 52. In this position, a pin 59 carried by the wheel 55 engages a stop 61 fixed on the valve body. The valve is fully opened when the pin 59 engages a second stop 62 on the valve body. It will be noted that during movement from closed position to fully open position of the throttle valve, a third outlet 63 of the valve body always remains open.

The outlet 63 is connected by a pipe 64 to the control valve 43, which, in turn, communicates through a pipe 66 and pipes 52 and 46 to the suction side of pump 15. The control valve 43 is normally closed but is opened, as will appear later, to by-pass fuel flowing into the throttle valve 42 and thereby reduce the amount of fuel flowing to the burners in the event excessive temperature of the motive fluid occurs.

The valve 43 comprises a valve body 67 having an annular chamber 68 into which the pipe 64 discharges, and a second annular chamber 71 which communicates with the outlet pipe 66. Communication between the chambers 68 and 71 and, therefore, between the inlet and outlet pipes 64 and 66, is controlled by means of a valve member 72, which is slidable in a sleeve 73 in a central bore of the valve body 67. The sleeve 73 is provided with ports 74 and 75 connecting the chambers 68 and 71, respectively, with the interior of the sleeve. The valve member 72 is biased in valve-closing direction by means of a compression spring 76.

The valve member 72 is adapted to be moved to the right (as viewed in Fig. 2) to uncover the by-pass openings 74, by means of the axial extension 80 projecting beyond the valve body 67 for contact by the free end 81 of the arm 82, which is non-rotatably mounted on the squared portion 83 of the shaft or rod 84, the latter being rotatably supported at its end adjacent to the arm 82 by the vertical ear 85, formed integral with the valve body 67. The valve member 72 is biased in an opening direction, preferably by means of a tension spring 86.

The other end of the rod 84 is rotatably supported by the block 87, secured to the outer wall 88 of the annular passage 89, through which hot gases flow from the combustion chamber to the gas turbine. Within the annular passage 89 is positioned an annular temperature-responsive member 90, rigidly secured at one end, by the support 91, to the inner wall 92 of the annular passage 89, and connected at its other end through the pivoted links 93 and 94 and arms 95 and 96 with the rod 84. The links 93 and 94 are pivotally connected, at 97, and the link 93 is pivotally mounted, at 98, on the inner wall 92 of the combustion passage 89.

Torque is applied to the shaft 84 in a counterclockwise direction by means of the spring 86 acting in opposition to the spring 76 to deflect the ring or annulus 90 with a uniform bending moment such that the stresses are below those at which creep would occur. The position of the valve 72 is fixed by the relation of torque applied to the shaft 84, the counterclockwise spring torque being directed to move the valve in an opening direction and the clockwise resisting torque of the annulus 90 being directed so that the valve may be moved in a closing direction by means of the spring 76.

Figure 6:
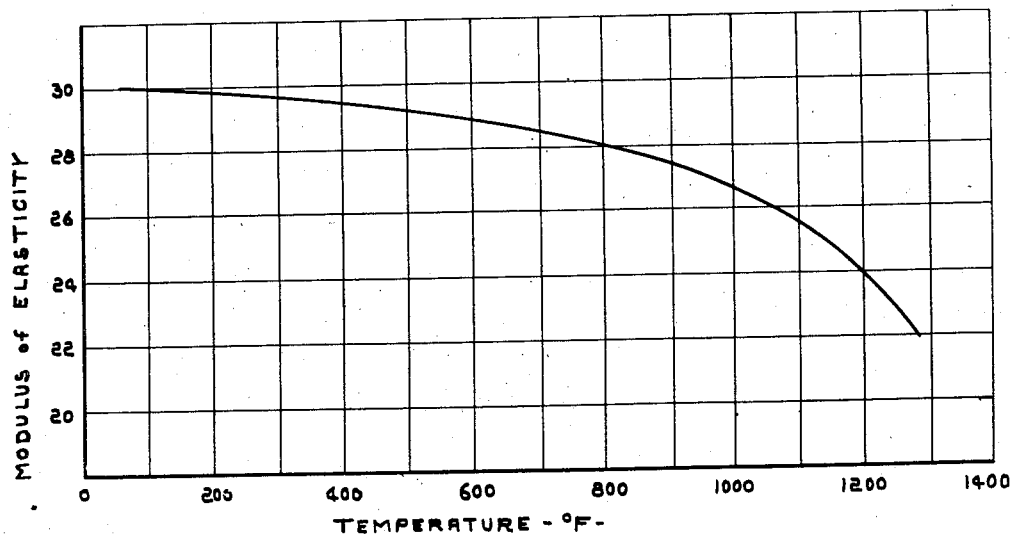

The ring or annulus 90 is preferably of a high temperature material, for example, a material of the class of precipitation hardening nickel-cobalt-chrominum base alloys such as the well-known K-42B. This alloy has the characteristic that its modulus of elasticity is reduced approximately 12 per cent upon an increase in temperature from around 1000° F. to 1200° F. (Fig. 6). Other well-known classes of high temperature oxidization resistant alloys, adapted to resist oxidization when heated, may of course be employed. Upon increase in temperature of the gases in the annular passage 89, from a safe temperature of around 1000° to an excessive temperature of 1200° or greater, the resulting reduction in modulus of elasticity will produce a corresponding decrease in the resisting torque applied to the rod 84, in consequence of which, to maintain a balanced relation of torques applied to the shaft 84, the annulus 90 deflects and the shaft moves counterclockwise, causing the arm 82 to move the by-pass valve member 72 to the right to uncover the by-pass ports 74. This will result in the by-passing of an increased amount of fuel through the conduit 64 to the pump inlet connection 66.

Suitable means, for example, the bellows 99, may be provided to seal the opening 100, formed in the outer wall 88 of the annular passage 89 for passage of the link 94.

In Fig. 5 there is illustrated a modified construction wherein the wall 105, of a structure containing hot gases, threadedly receives a plug 106 carrying an elongated supporting member 107, to whose inner or free end is rigidly secured one end of a temperature-responsive element 108 of a material similar to that described above.

This element 108 extends through an opening 109 in the plug 106, and carries, adjacent its outer end 111, a contact 112 adapted to engage a snap switch 113 under certain conditions. A spring 114, whose compressive force may be adjusted by the screw 115, urges the contact 112 towards the snap switch 113 to close the latter by contact therewith. The force of the spring 114 is resisted by the resiliency of the temperature-responsive element 108, and this resistance varies with changes of modulus of elasticity resulting from changes in the temperature thereof, exactly as in the previously-described construction.

While the invention has been shown in several forms, it will be obvious to those skilled in the art that it is not so limited, but is susceptible of various other changes and modifications without departing from the spirit thereof.

What is claimed is:

In a gas turbine wherein the blading is supplied with gaseous motive fluid by means of an annular passage formed by stationary structure and wherein the motive fluid is produced by combustion of fluid fuel, an approximately annular metallic member disposed in said passage and arranged substantially coaxially thereof, said annular metallic member having closely spaced ends and having the characteristic that its modulus of elasticity decreases slowly with increase in temperature below a predetermined degree and decreases rapidly with increase in temperature above said predetermined degree, means for anchoring one end of the annular metallic member to said stationary structure, a lever fulcrumed to said stationary structure and connected to the other end of the annular metallic member, a movable fuel control member, a spring for biasing the fuel control member to move in a direction to reduce the input of fuel, said movable fuel control member and said spring being located externally of said stationary structure, and means for connecting said fuel control member and said lever so that elastic forces exerted thereon by the spring and the annular metallic member are in opposed relation, whereby reduction in elastic modulus of the annular member due to increase in temperature in said annular passage results in the spring moving the fuel control member to reduce the input of fuel.

CHARLES D. FLAGLE.

REFERENCES CITED

The following references are of record in the file of this patent:

UNITED STATES PATENTS

| Number | Name | Date |
|---|---|---|
| 1,253,413 | Morris | Jan. 15, 1918 |
| 1,695,877 | Brace | Dec. 18, 1928 |
| 1,705,694 | White | Mar. 19, 1929 |
| 1,780,809 | Bowen | Nov. 4, 1930 |
| 2,063,592 | De Rochemont | Dec. 8, 1936 |